United States Patent [19]

Umeda et al.

[11] Patent Number: 4,888,646
[45] Date of Patent: Dec. 19, 1989

[54] OPTIMAL IMAGE-QUALITY SELECTION APPARATUS

[75] Inventors: Tetsuo Umeda; Fumihiko Sugiura, both of Tokyo, Japan

[73] Assignee: NEC Corporation, Japan

[21] Appl. No.: 301,853

[22] Filed: Jan. 25, 1989

[30] Foreign Application Priority Data

Jan. 29, 1988 [JP] Japan .................................. 63-18823

[51] Int. Cl.4 .............................................. H04N 1/40
[52] U.S. Cl. .................................... 358/464; 358/447; 382/9
[58] Field of Search ............... 358/256, 280, 284, 282, 358/293, 283; 382/9

[56] References Cited

U.S. PATENT DOCUMENTS

| | | | |
|---|---|---|---|
| 4,554,593 | 11/1988 | Fox et al. | 358/284 |
| 4,586,089 | 4/1986 | Nakazato | 358/280 |
| 4,672,463 | 6/1987 | Tomohisa et al. | 358/282 |
| 4,821,108 | 4/1989 | Barbagelata et al. | 358/282 |

Primary Examiner—Edward L. Coles, Sr.
Attorney, Agent, or Firm—Laff, Whitesel, Conte & Saret

[57] ABSTRACT

An optimal image-quality selection apparatus calculates a ratio of the number of graphic blocks having a predetermined size to the number of all graphic blocks of an image having two or more depth levels of color and selects an image having a largest one of the ratios as an image of optimal quality.

2 Claims, 2 Drawing Sheets

OPTIMAL IMAGE-QUALITY SELECTION APPARATUS

BACKGROUND OF THE INVENTION

The present invention relates to an optimal image-quality selection apparatus for selecting an optimal quality of an image in an optical reader and more particularly, relates to an apparatus for selecting an optimal depth of color of the image.

In a conventional optical reader, the following methods are available as a method of digitizing a video signal output from a scanner to a processor: a method of digitizing a video signal with reference to fixed depth levels; a method of digitizing a video signal on the basis of depth levels of a background color; a method of digitizing a video signal by using a space filter so as to correspond to a change in the depth of color of a character, graphic, or the like; and a method of processing a video signal as a multi-level signal.

It is difficult to apply the method of processing the video signal as the multi-level signal to a character reader used for reading addresses on postal matters because of following reasons. That is, there are many kinds of envelopes having different colors of various depths and various thicknesses of the materials thereof. When the thickness of the material of the envelope is small, some pattern printed on the envelope with a light color and content of the envelope may be seen through. In addition, the addresses printed on the envelopes have various depths of color.

Accordingly, the video signal output from the scanner of the character reader has too broad range of depth level to be digitized as a multi-level signal. Therefore, the digitizing method on the basis of the background level or the digitizing method by the space filter have been employed.

However, when a depth level is set to read addresses which are printed with light characters, images including many noise components other than the addresses appear when the addresses are printed on envelopes having the small thickness. On the contrary, when the depth level is set not to detect the noise components, the addresses which are printed with light-color characters can not be read.

SUMMARY OF THE INVENTION

It is an object of the present invention to provide an optimal image-quality selection apparatus free from the conventional drawbacks described above.

An optimal image-quality selection apparatus according to the present invention comprises means for quantizing a video signal obtained from a scanner in an optical reader into two or more depth levels, means for detecting graphic blocks of a quantized image and counting the number of graphic blocks, means for calculating a ratio of the number of predetermined size graphic blocks to the number of all graphic blocks.

DETAILED DESCRIPTION OF THE PREFERRED EMBODIMENT

Figure 1:
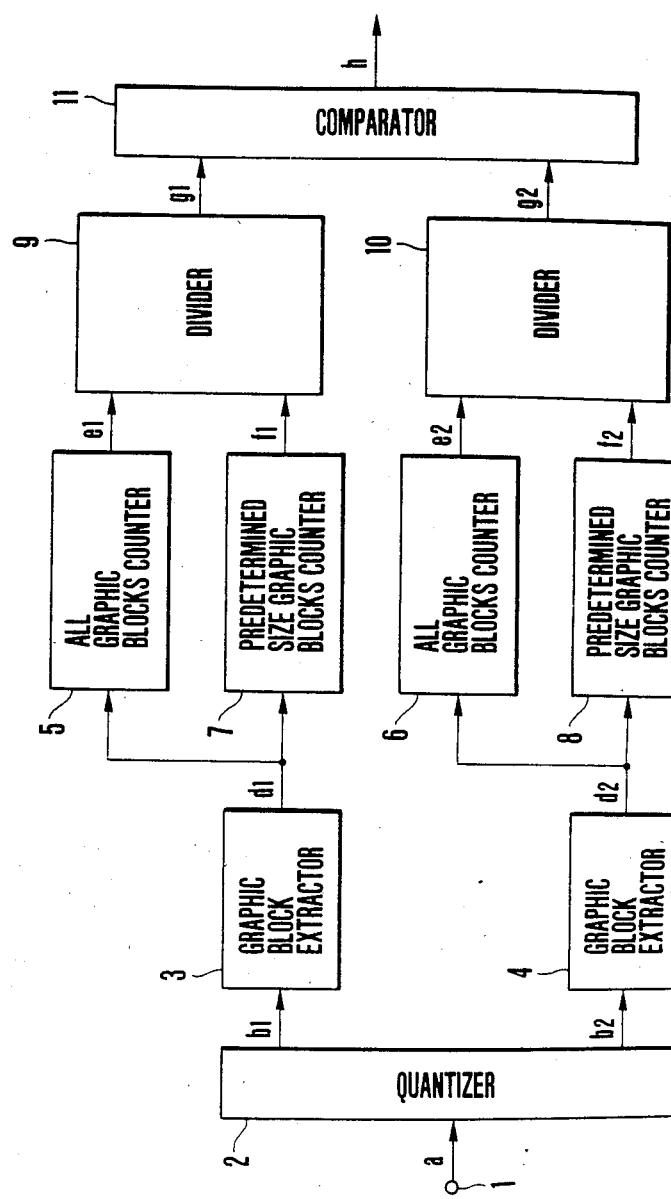
FIG. 1 is a block diagram of an optimal image-quality selection apparatus according to an embodiment of the present invention.

FIG. 1 is a block diagram sowing an optimal image-quality selection apparatus according to an embodiment of the present invention. Referring to FIG. 1, a video signal a representing an image is input from a scanner (not shown) to a quantizer 2. The quantizer 2 quantizes the input video signal a by using two threshold levels and outputs binary video signals $b_1$ and $b_2$ representing the image by high and low depth of which levels, respectively. The binary video signals $b_1$ and $b_2$ are input to graphic block extractors 3 and 4, respectively. The graphic block extractor 3 extracts graphic blocks from the binary video signal $b_1$ and outputs an information signal $d_1$ representing the size, e.g., the height and width of each extracted graphic block. The graphic block is defined as a chain of dots. The graphic block extractor 4 extracts graphic blocks from the input binary video signal $b_2$ and outputs an information signal $d_2$ representing the size, e.g., the height and width of each extracted graphic block.

An all graphic blocks counter 5 counts the number of all graphic blocks extracted from the information signal $d_1$ output from the graphic block extractor 3. The all graphic blocks counter 5 outputs a first all graphic block count signal $e_1$. An all graphic blocks counter 6 counts the number of all blocks extracted from the information signal $d_2$ output from the graphic block extractor 4 and outputs a second all graphic block count signal $e_2$.

A predetermined size graphic blocks counter 7 counts the number of graphic blocks having a predetermined size or falling within a predetermined range from the information signal $d_1$ output from the graphic block extractor 3 and outputs a first predetermined size block count signal $f_1$. A predetermined size graphic block counter 8 counts the number of graphic blocks having a predetermined size from the information signal $d_2$ output from the graphic block extractor 4 and outputs a second predetermined size block count signal $f_2$.

A divider 9 calculates a ratio of the first predetermined size block count signal $f_1$ output from the counter 7 to the first all graphic block count signal $e_1$ output from the counter 5, that is, a ratio $f_1/e_1$, and outputs a first ratio signal $g_1$ representing the ratio $f_1/e_1$. A divider 10 calculates a ratio of the second predetermined size block count signal $f_2$ output from the counter 8 to the second all graphic block count signal $e_2$ output from the counter 6, i.e., a ratio $f_2/e_2$, and outputs a second ratio signal $g_2$ representing the ratio $f_2/e_2$.

A comparator 11 compares the first and second ratio signals $g_1$ and $g_2$ from the dividers 9 and 10 and outputs an optimal image-quality signal h which defines as optimal image quality a larger value represented by the first or second ratio signal $g_1$ or $g_2$.

The quantizer 2 may be a quantizer which dynamically tracing the depth of the background color or a quantizer for performing image processing by using a space filter. It is essential that the quantizer 2 outputs the video signals $b_1$ and $b_2$ having two depth levels, respectively. The binary video signals $b_1$ and $b_2$ are input to the graphic block extractors 3 and 4 each having a character recognition apparatus, an image recognition apparatus, or a video memory and are simultaneously or sequentially processed. Detailed arrangements of the graphic block extractors 3 and 4 are described in Japanese Patent Application No. 56-27512 entitled as a "Character Extraction Apparatus". For example, if characters are to be read, the graphic block having the predetermined size corresponds to each character. The size of the character can be represented by, e.g., its height and width.

An operation of the optimal image-quality selection apparatus shown in FIG. 1 will now be described. When the image signal a sent from a scanner (not shown) is input to the quantizer 2 through an input terminal 1 the quantizer 2 performs quantization by using two binary threshold values and outputs the two video signals $b_1$ and $b_2$ each representing an image by a high and low depth levels, respectively. The graphic block extractor 3 extracts graphic blocks included in an image represented by the binary video signal $b_1$ having the high depth level and outputs the information signal $d_1$ representing the size of each extracted graphic block. Similarly, the graphic block extractor 4 detects graphic blocks included in an image represented by the binary video signal $b_2$ having the low depth level and outputs the information signal $d_2$ representing the size of each extracted block.

The all graphic blocks counter 5 counts the number of graphic blocks represented by the information signal $d_1$ regardless of the sizes of the graphic blocks and outputs the first all graphic block count signal $e_1$. The all graphic blocks counter 6 counts the number of graphic blocks represented by the information signal $d_2$ regardless of the sizes of the graphic blocks and outputs the second all graphic block count signal $e_2$.

The predetermined size graphic blocks counter 7 counts the number of graphic blocks having a predetermined size or falling within a predetermined range and outputs the first predetermined graphic block count signal $f_1$. The predetermined size graphic blocks counter 8 counts the number of graphic blocks having the predetermined size or falling within the predetermined range and outputs the second predetermined graphic block count signal $f_2$. Each of the predetermined size graphic blocks counters 7 and 8 counts the number of only graphic blocks which satisfy conditions $Hmin \leq H \leq Mmax$ and $Wmin \leq W \leq Wmax$ if the size information of the graphic block represents a height H and a width W. Hmin, Hmax, Wmin, and Wmax can be arbitrarily determined.

The divider 9 calculates the ratio of the first predetermined size graphic block count signal $f_1$ to the first all graphic block count signal $e_1$, i.e., the ratio $f_1/e_1$ and outputs the first ratio signal $g_1$ representing the ratio of the number of graphic blocks having a predetermined size to the number of all graphic blocks. The divider 10 calculates the ratio of the second predetermined size graphic block count signal $f_2$ to the second all graphic block count signal $e_2$, i.e., the ratio $f_2/e_2$ and outputs the second ratio signal $g_2$ representing the ratio of the number of graphic blocks having a predetermined size to the number of all graphic blocks.

The comparator 11 compares the first and second ratio signals $g_1$ and $g_2$ to select to select a larger ratio signal and outputs a signal h representing that the set level corresponding to the larger ratio signal is optimal.

The apparatus shown in FIG. 1 was tested with paper samples A and B which are thick and thin, respectively, and following results were obtained.

The characters were written on the paper sample A with a light color. In this case, the many character images extracted by the lower depth level were blurred and the character images extracted by the higher depth level had a better image quality.

More specifically, the first all graphic block count $e_1 = 30$, the second all graphic block count $e_2 = 50$, the first predetermined size graphic block count $f_1 = 28$, and the second predetermined size graphic block $f_2 = 23$.

In case of the sample B, since the paper was very thin, characters printed on the lower surface of the paper were seen through the paper. These characters appeared as noise at a higher depth level, but did not appear at a lower depth level. Test results were as follows: the first all graphic block count $e_1 = 100$; the second all graphic block count $e_2 = 30$; the first predetermined size graphic block count $f_1 = 25$; and the second predetermined size graphic block count $f_2 = 23$.

The images of the characters written on the sample A has higher image quality at the higher depth level, while images of the characters written on the sample B has higher image quality at the lower depth level. In the case of the sample A, $g_1 = f_1/e_1 = 28/30$ at the lower depth level and $g_2 = f_2/e_2 = 23/50$ at the higher depth level, so that condition $g_1 > g_2$ can be established, thereby discriminating the higher depth level as a depth level for optimal image quality. In the case of the sample B, $g_1 = f_1/e_1 = 25/100$ at the higher depth level and $g_2 = f_2/e_2 = 23/30$ at the lower depth level, so that condition $g_1 < g_2$ can be established, thereby selecting the lower depth level as a level for optimal image quality.

In the above embodiment, the two depth levels are discriminated. However, three or more depth levels can be discriminated.

Figure 2A:
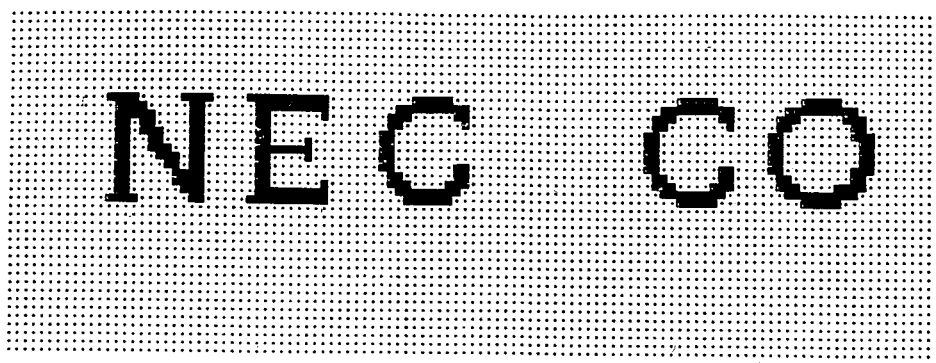
FIGS. 2A, 2B, and 2C are views for explaining an operation of the apparatus shown in FIG. 1.
Figure 2B:
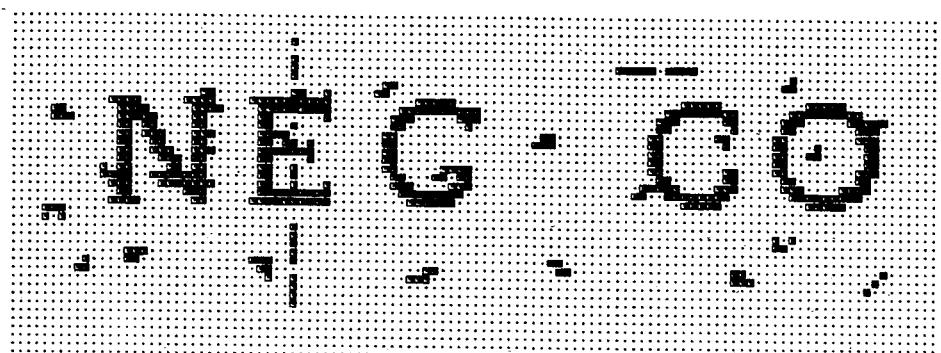
Figure 2C:
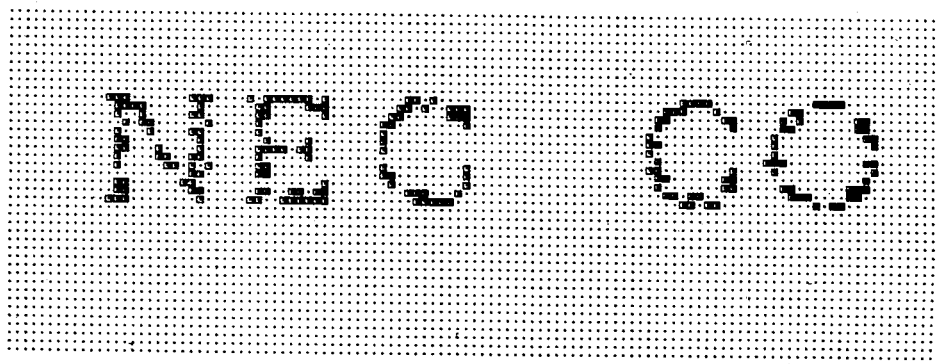

FIGS. 2A, 2B, and 2C show images having three image qualities, i.e., an optimal image quality, an excessively deep image quality, and an excessively light image quality.

If the predetermined range of the characters was exemplified by $10 \leq H \leq 20$ and $10 \leq W \leq 20$, the number f of graphic blocks having a predetermined size, the number e of all graphic blocks, and the ratio g of the number of graphic blocks having a predetermined size to the number of all graphic blocks were obtained as follows:

|         | f | e  | g = f/e |
|---------|---|----|---------|
| FIG. 2A | 5 | 5  | 1       |
| FIG. 2B | 5 | 25 | 0.2     |
| FIG. 2C | 2 | 19 | 0.11    |

The image having the largest f/e in FIG. 2A is selected as an image having optimal image quality.

What is claimed is

1. An optimal image-quality selection apparatus comprising:
   means for quantizing a signal representing an image, obtained from a scanner, to output two or more video signals representing the image by different depth levels;
   means for detecting and counting all the graphic blocks included in each of the two or more video signals, the graphic block being defined as a chain of dots in the image;
   means for detecting and counting the number of graphic blocks having a predetermined size in each of the two or more video signals;
   means for calculating a ratio of the number of graphic blocks having the predetermined size to the number of the all graphic blocks included in each of the two or more video signals, respectively; and means for selecting a largest one out of the ratios corresponding to the two or more video signals to output a signal representing that a depth level corresponding to the largest ratio is optimal.

2. An optimal image-quality selection apparatus comprising:

means for quantizing a signal output from a scanner into a plurality of video signals having different depth levels of a color;

a plurality of block extractors for inputting the plurality of the video signals to extract graphic blocks, respectively;

a plurality of pairs of first and second counters connected to said block extractors in one to one correspondence, said first counter counting number of all the graphic blocks and said second counter counting number of graphic blocks having a predetermined size;

a plurality of dividers each connected to said a plurality of pairs of said first and second counters in one to one correspondence, each of the plurality of said dividers calculates a ratio of the number of graphic blocks having a predetermined size and the number of all the graphic blocks output from each of the corresponding pairs; and a comparator for comparing the ratios output from the plurality of said dividers to select a largest ratio and outputting a signal representing that an image having the largest ratio has an optimal image quality.

* * * * *